US010375548B2

(12) United States Patent
Kodaypak et al.

(10) Patent No.: US 10,375,548 B2
(45) Date of Patent: Aug. 6, 2019

(54) METHOD AND APPARATUS FOR DATA DELIVERY TO WIRELESS COMMUNICATION DEVICES

(71) Applicant: AT&T INTELLECTUAL PROPERTY I, L.P., Atlanta, GA (US)

(72) Inventors: Rajendra Prasad Kodaypak, Sammamish, WA (US); Douglas Eng, Sammamish, WA (US); Farooq Bari, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 84 days.

(21) Appl. No.: 15/266,441

(22) Filed: Sep. 15, 2016

(65) Prior Publication Data

US 2018/0077714 A1    Mar. 15, 2018

(51) Int. Cl.
*H04W 4/60* (2018.01)
*H04W 4/20* (2018.01)
(Continued)

(52) U.S. Cl.
CPC .......... *H04W 4/60* (2018.02); *H04L 65/1016* (2013.01); *H04L 65/1063* (2013.01);
(Continued)

(58) Field of Classification Search
None
See application file for complete search history.

(56) References Cited

U.S. PATENT DOCUMENTS 7,546,308 B1 *   6/2009   Hu ..................... H04L 67/322
9,049,538 B2     6/2015   Lee et al.
(Continued)

FOREIGN PATENT DOCUMENTS

CN    102724711 A    10/2012
EP      2509357 A1   10/2012
(Continued)

OTHER PUBLICATIONS

Ghadialy, Zahid, "Nokia LTE M2M Optimizing LTE for the Internet of Things", http://www.slideshare.net/zahidtg/nokia-lte-m2mwhitepaper1?from_action=save, Discloses solutions for congestion control in networks that use priority access control indicators., 2015.
(Continued)

*Primary Examiner* — Christopher T Wyllie
(74) *Attorney, Agent, or Firm* — Guntin & Gust, PLC; Douglas Schnabel

(57) ABSTRACT

Aspects of the subject disclosure may include, for example, receiving, from an application server, a data transfer request associated with delivery of data from the application server to a wireless communication device that is connected to a mobile communication network, determining a priority score for the data transfer request associated with the wireless communication device according to status information in a subscription profile associated with the wireless communication device, comparing the priority score for the data transfer request associated with the wireless communication device to a plurality of priority scores associated with a plurality of data transfer requests associated with deliver of data to a plurality of wireless communication devices that are connected to the mobile communication network to generate a transfer order mapping of a set of requests comprising the data transfer request and the plurality of data transfer requests, and transferring the data from the application server to the wireless communication device according to the transfer order mapping of the set of requests. Other embodiments are disclosed.

20 Claims, 8 Drawing Sheets

(51) Int. Cl.
| | |
|---|---|
| *H04L 29/08* | (2006.01) |
| *H04W 76/00* | (2018.01) |
| *H04L 29/06* | (2006.01) |
| *H04W 8/20* | (2009.01) |
| *H04W 88/02* | (2009.01) |
| *H04W 88/16* | (2009.01) |
| *H04L 1/00* | (2006.01) |
| *H04W 4/70* | (2018.01) |
| *H04L 29/12* | (2006.01) |

(52) U.S. Cl.
CPC .............. *H04L 67/306* (2013.01); *H04W 4/20* (2013.01); *H04W 8/20* (2013.01); *H04W 76/00* (2013.01); *H04L 1/0018* (2013.01); *H04L 61/1588* (2013.01); *H04L 65/1073* (2013.01); *H04W 4/70* (2018.02); *H04W 88/02* (2013.01); *H04W 88/16* (2013.01)

(56) References Cited

U.S. PATENT DOCUMENTS

| | | | |
|---|---|---|---|
| 9,155,105 B2 | 10/2015 | Hsu | |
| 2002/0010746 A1* | 1/2002 | Jilk, Jr. | H04L 51/28 709/206 |
| 2003/0050058 A1* | 3/2003 | Walsh | G11B 27/102 455/426.1 |
| 2006/0036764 A1* | 2/2006 | Yokota | H04L 67/322 709/240 |
| 2008/0189429 A1* | 8/2008 | DaCosta | H04L 29/06027 709/231 |
| 2010/0291943 A1* | 11/2010 | Mihaly | H04L 29/12066 455/450 |
| 2011/0145319 A1* | 6/2011 | Dolan | H04L 47/72 709/203 |
| 2011/0202730 A1* | 8/2011 | Sonoda | H04L 63/0815 711/141 |
| 2012/0020285 A1* | 1/2012 | Cheon | H04W 76/12 370/328 |
| 2012/0047551 A1 | 2/2012 | Pattar et al. | |
| 2013/0015953 A1 | 1/2013 | Hsu et al. | |
| 2013/0028112 A1* | 1/2013 | Mizutani | H04L 43/106 370/252 |
| 2013/0111031 A1* | 5/2013 | Hoffmann | G06F 9/505 709/226 |
| 2013/0121207 A1* | 5/2013 | Parker | H04L 67/10 370/254 |
| 2013/0121298 A1* | 5/2013 | Rune | H04L 29/12066 370/329 |
| 2013/0142118 A1 | 6/2013 | Cherian et al. | |
| 2014/0003339 A1 | 1/2014 | Jain et al. | |
| 2014/0169269 A1* | 6/2014 | Salot | H04W 76/10 370/328 |
| 2014/0169286 A1* | 6/2014 | Xu | H04W 8/02 370/329 |
| 2014/0179293 A1 | 6/2014 | Li et al. | |
| 2014/0206388 A1* | 7/2014 | Busin | G01S 5/0242 455/456.1 |
| 2014/0220936 A1* | 8/2014 | Turtinen | H04W 76/14 455/411 |
| 2014/0241354 A1 | 8/2014 | Shuman et al. | |
| 2014/0242940 A1 | 8/2014 | Koo et al. | |
| 2014/0244834 A1 | 8/2014 | Guedalia et al. | |
| 2014/0324973 A1 | 10/2014 | Goel et al. | |
| 2015/0007273 A1 | 1/2015 | Lin | |
| 2015/0063122 A1* | 3/2015 | Chiang | H04L 45/24 370/238 |
| 2016/0007138 A1 | 1/2016 | Palanisamy et al. | |
| 2016/0036908 A1 | 2/2016 | Aggarwal et al. | |
| 2016/0044651 A1 | 2/2016 | Lu | |
| 2016/0094395 A1 | 3/2016 | Hu | |
| 2016/0119773 A1* | 4/2016 | Xu | H04M 15/8038 455/432.2 |
| 2016/0128043 A1 | 5/2016 | Shuman et al. | |
| 2016/0174209 A1 | 6/2016 | Park et al. | |
| 2016/0366061 A1* | 12/2016 | Renzullo | H04L 67/1002 |
| 2017/0111279 A1* | 4/2017 | Renzullo | H04L 12/1407 |
| 2017/0195822 A1* | 7/2017 | Watfa | H04W 4/08 |
| 2017/0244629 A1* | 8/2017 | Kodaypak | H04W 4/70 |
| 2017/0366428 A1* | 12/2017 | Shaw | H04L 43/0811 |
| 2018/0077714 A1* | 3/2018 | Kodaypak | H04W 76/00 |

FOREIGN PATENT DOCUMENTS

| | | |
|---|---|---|
| GB | 2507426 A | 4/2014 |
| IN | 201401894 | 1/2016 |
| WO | 2015153589 | 10/2015 |
| WO | 2015199584 | 12/2015 |
| WO | 2015185726 | 12/2016 |

OTHER PUBLICATIONS

Mahendra, Agarwal, "Accomodating IOT / M2M Requirements in the Cellular Ecosystem", http://www.wipro.com/documents/accommodating-IoT-M2M-requirements-in-the-cellular-ecosystem.pdf, Discloses how overload and congestion can be handled in a network with a large number of IoT devices, including assigning and controlling connection/access based on priority., 2015.

Mehmood, Yasir, "Mobile M2M communication architectures, upcoming challenges, applications, and future directions", http://jwcn.eurasipjournals.springeropen.com/articles/10.1186/s13638-015-0479-y, Discloses traffic control schemes that use dynamically alterabledevice priority., 2015.

Taleb, Tarik, "Machine Type Communications in 3GPP Networks: Potential, Challenges, and Solutions", http://ieeexplore.ieee.org/xpl/login.jsp?tp=&arnumber=6163599, Discloses subscription control to avoid network congestion/overload control., 2012.

Taleb, Tarik, "On alleviating MTC overload in EPS", http://www.soqube.com/tariktaleb/public_html1.1/Library/jrl_papers/jrn_new/1-s2.0-S1570870513000401-main.pdf, Discloses mechanisms that anticipate system overload due to MTC signaling messages in 3GPP networks., 2014.

Tavana, Morteza, "Congestion Control for Bursty M2M Traffic in LTE Networks", http://ieeexplore.ieee.org/xpl/login.jsp?tp=&arnumber=7249249, Proposes an access class barring (ACB) scheme to control congestion., 2015.

* cited by examiner

100

200

300

400

500

METHOD AND APPARATUS FOR DATA DELIVERY TO WIRELESS COMMUNICATION DEVICES

FIELD OF THE DISCLOSURE

The subject disclosure relates to a method and apparatus for data delivery to wireless communication devices.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

Figure 1:
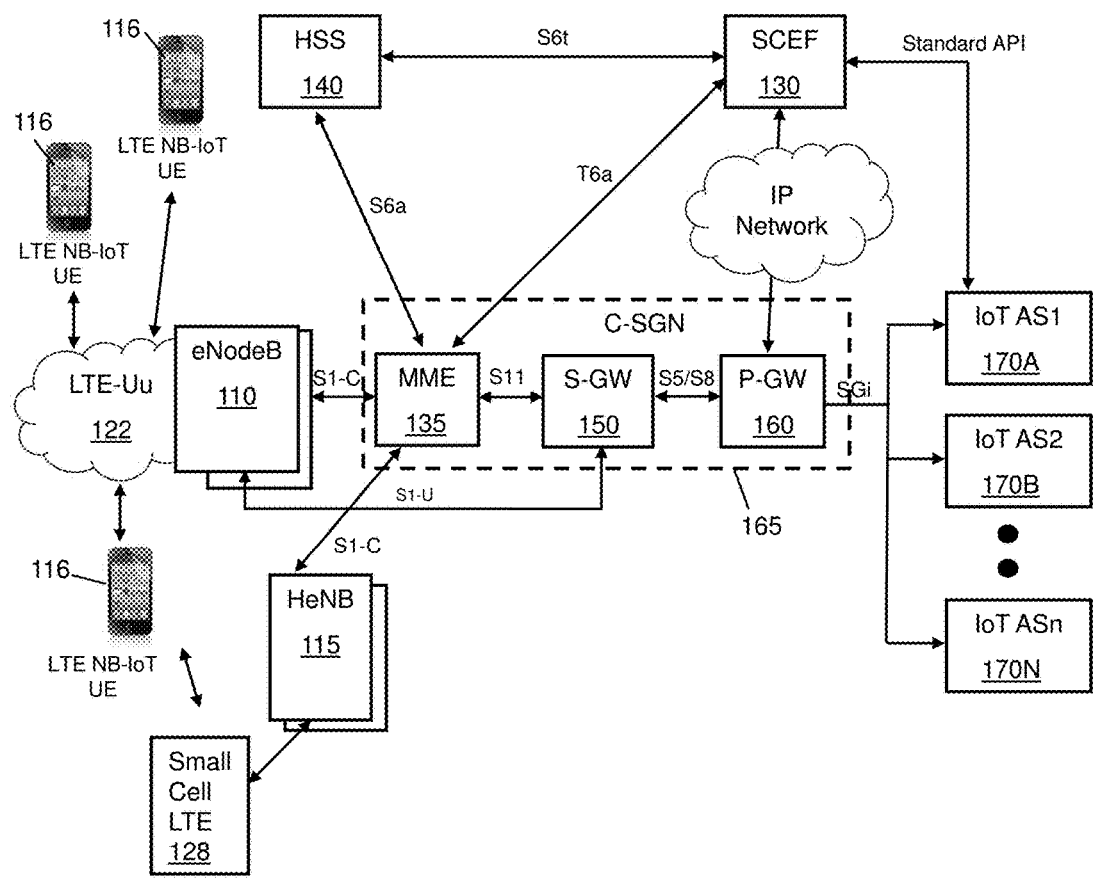
FIG. 1 depicts illustrative embodiments of a system for data delivery to narrow band communication devices in a mobile communication network.
Figure 3:
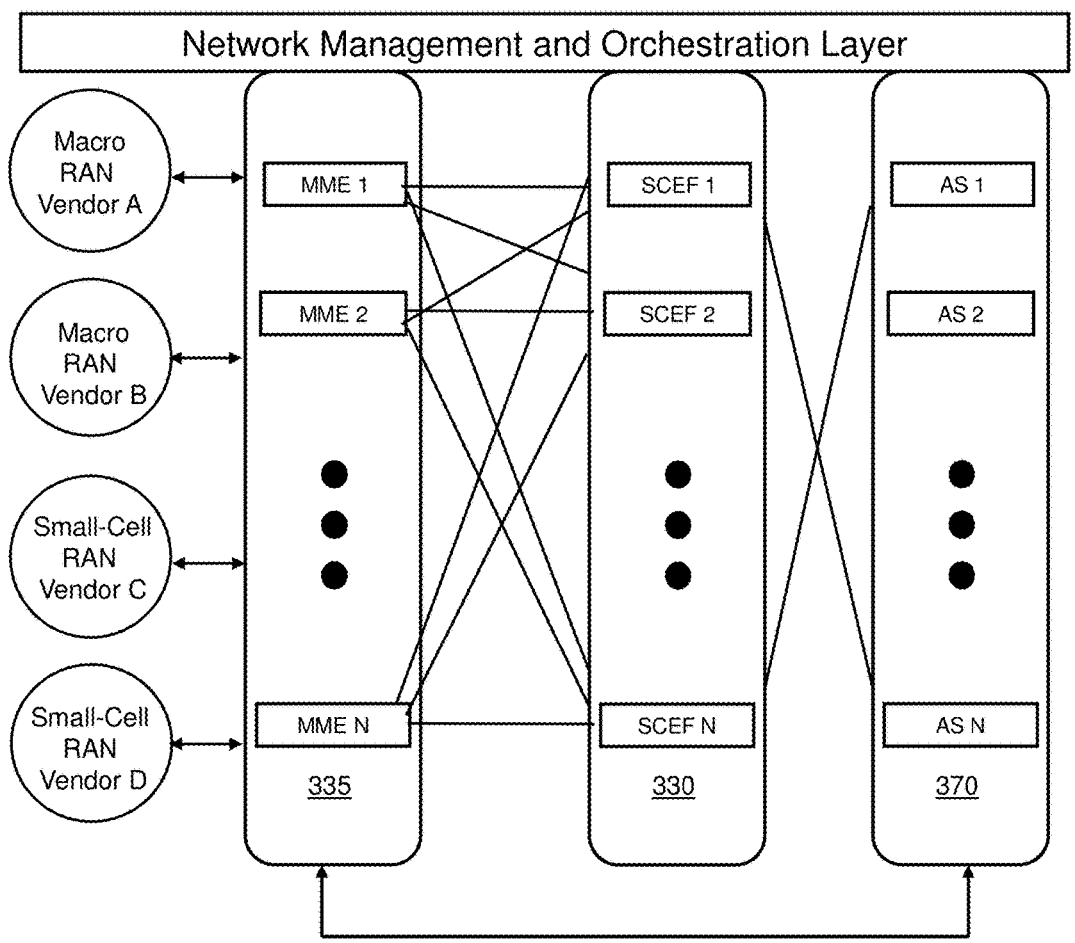
FIGS. 3-4 depict illustrative embodiments of systems for data delivery to narrow band communication devices in a mobile communication network.
Figure 4:
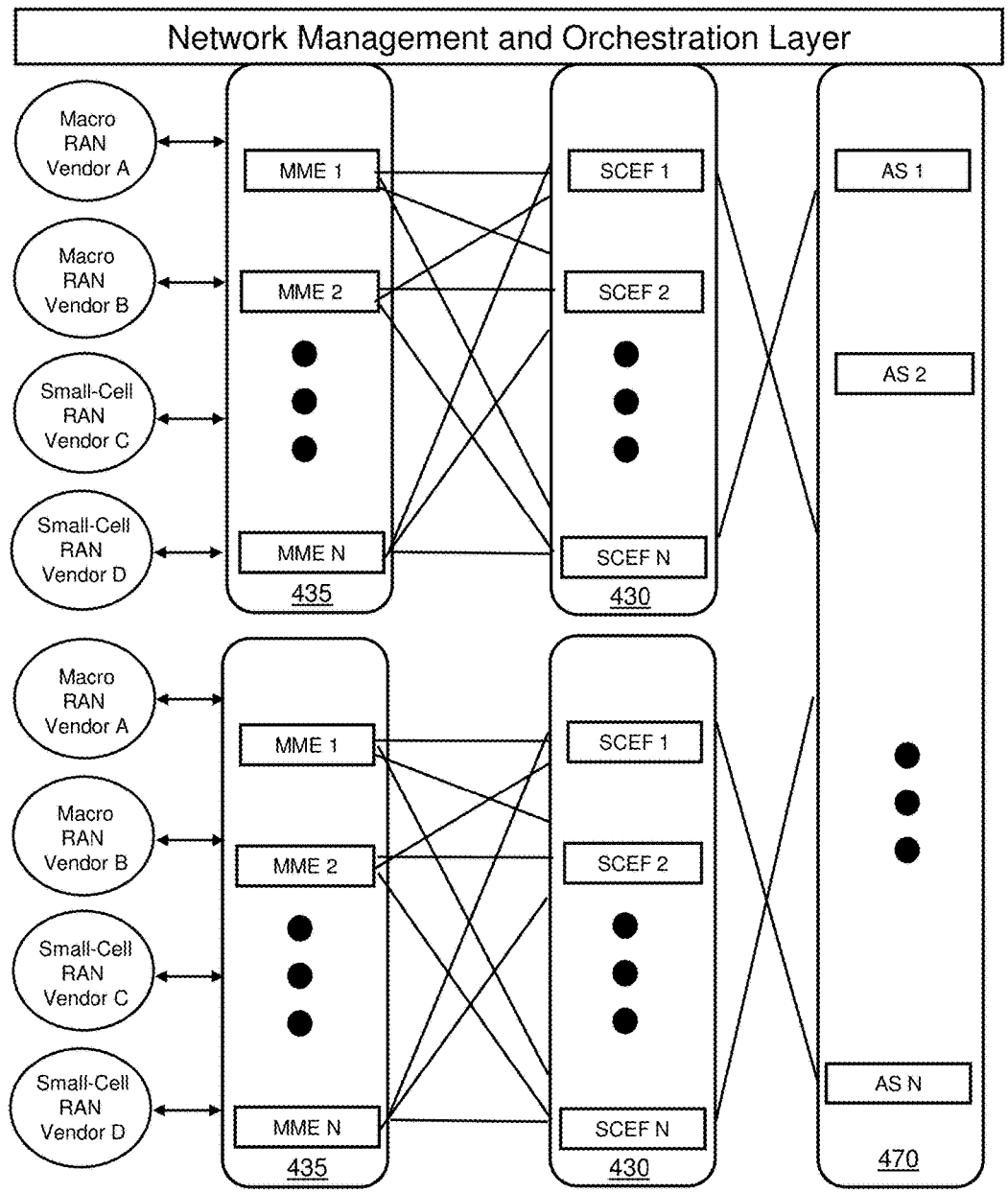
Figure 5:
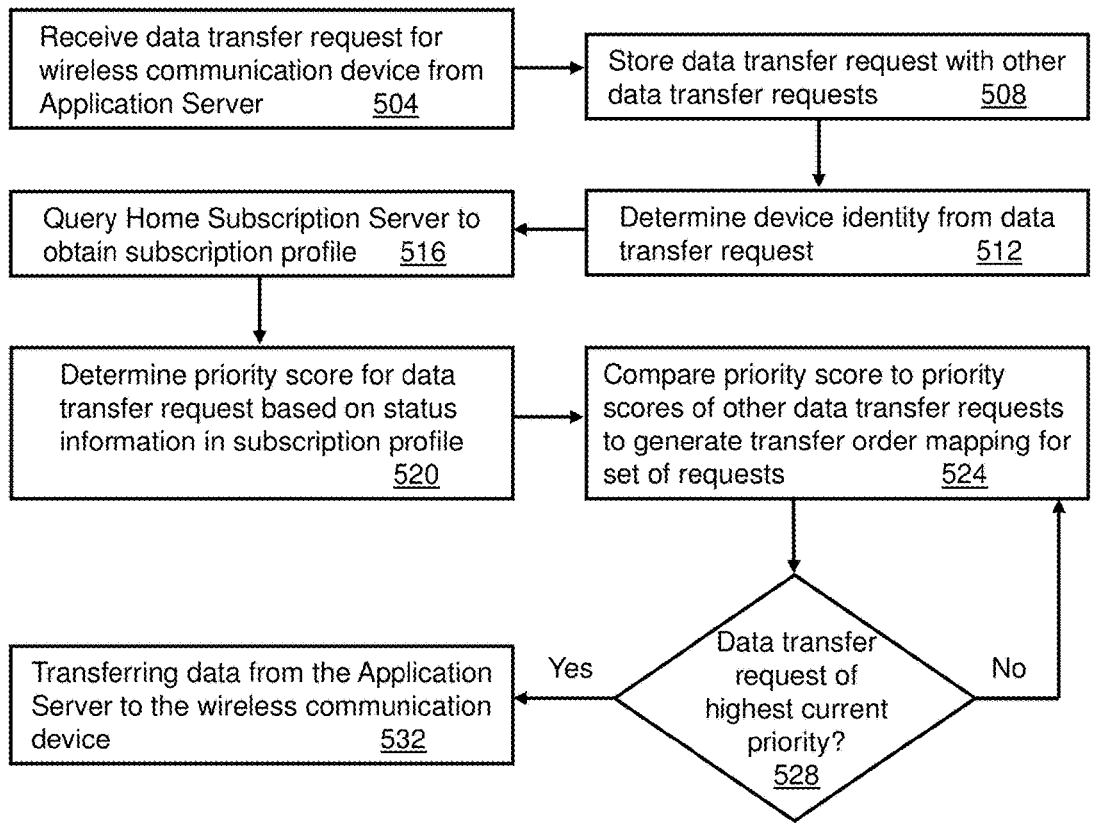
Figure 6:
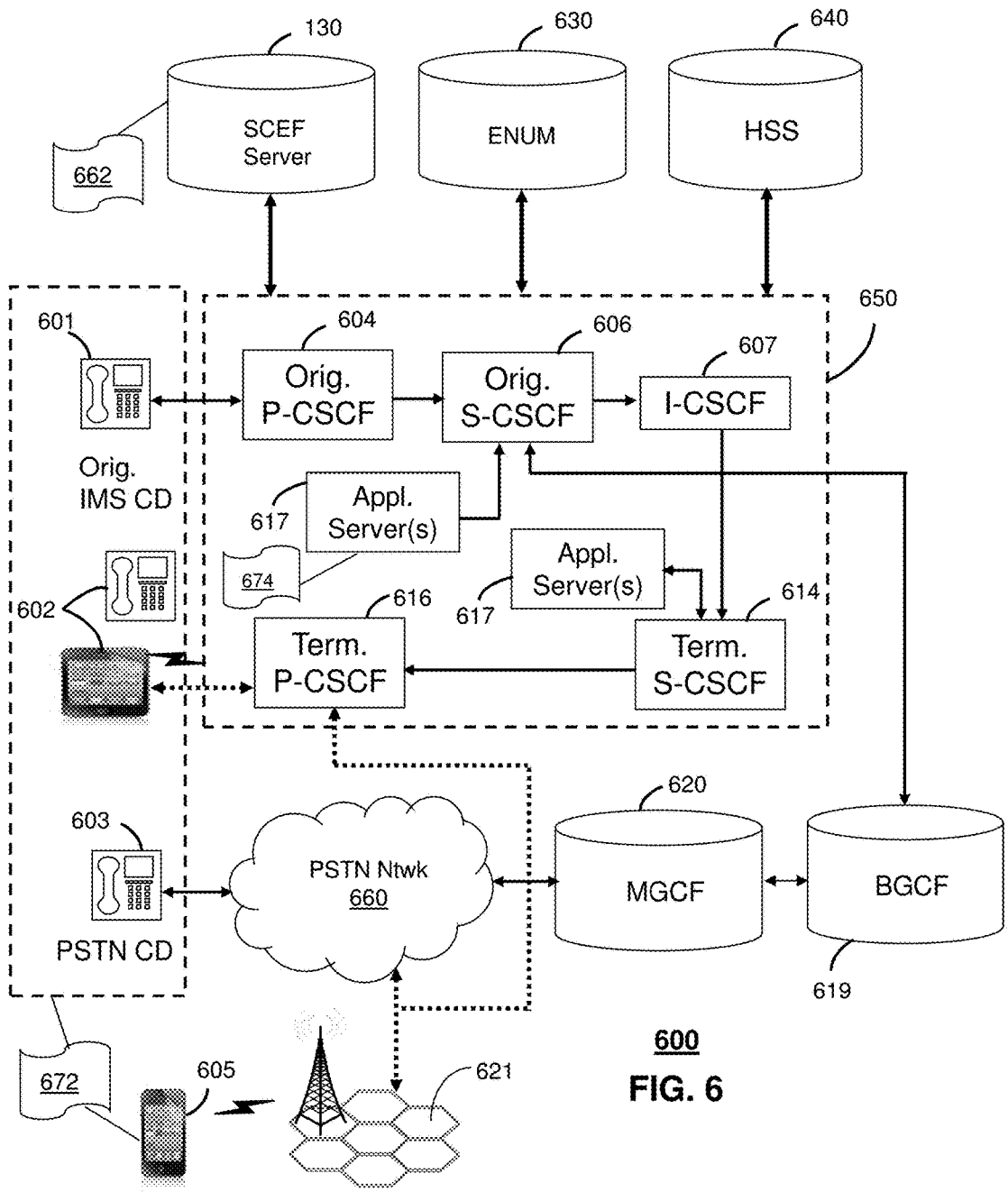
Figure 7:
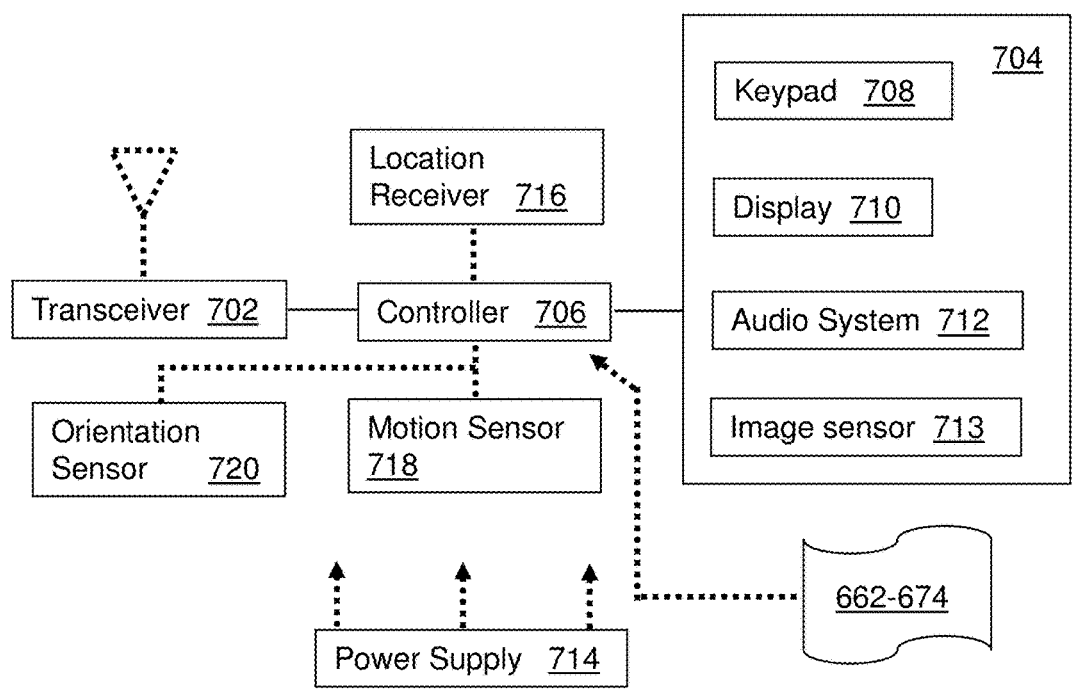

using geo-redundant data centers with dynamically paired modes;

FIG. 5 depicts illustrative embodiments of a method used in portions of the systems described in FIGS. 1 and 3-4;

FIG. 6 depicts illustrative embodiments of a communication system that provides communication and media services for communication devices according to embodiments illustrated in FIGS. 1 and 3-4;

FIG. 7 depicts an illustrative embodiment of a communication device; and

Figure 8:
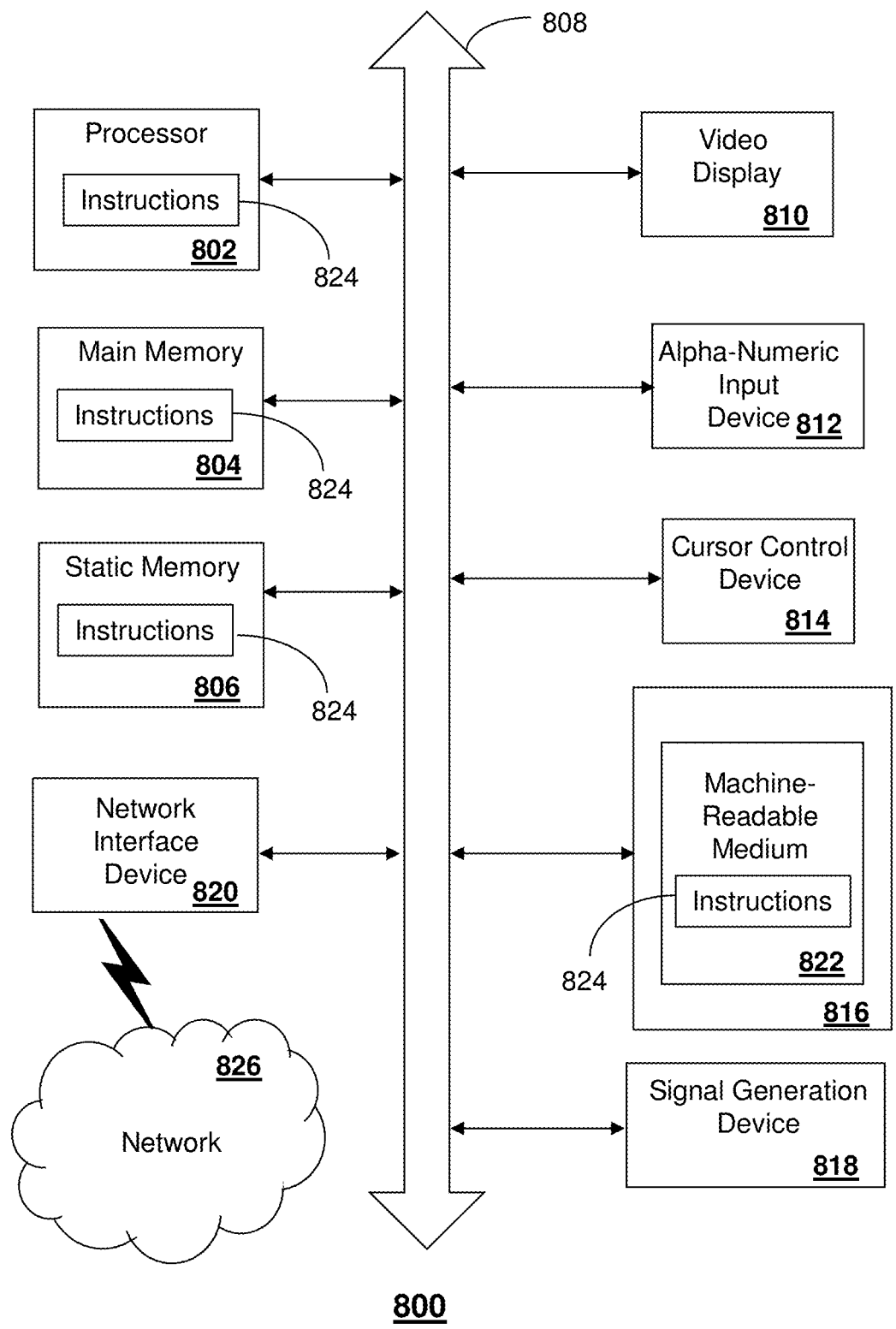

FIG. 8 is a diagrammatic representation of a machine in the form of a computer system within which a set of instructions, when executed, may cause the machine to perform any one or more of the methods described herein.

DETAILED DESCRIPTION

The subject disclosure describes, among other things, illustrative embodiments for a method and an apparatus for delivery of data to wireless communication devices. An Application Server can connect to a Long-Term Evolution (LTE) mobile communication system to transmit data to a wireless communication device that is connected to the LTE system. A Service Capability Exposure Function (SCEF) server can receive a request from the Application Server for transmission of the data to the wireless communication device. The SCEF server can buffer the request along with other requests from one or more Application Servers for transmitting data to one or more wireless devices connected to the LTE system. The SCEF server can obtain subscription profile information for the wireless communication device from the home subscriber server (HSS) and can determine a priority score for the wireless communication device based on status information from its subscription profile. Such status information could be related to the service type being requested, device category, device priority access etc. The SCEF server can compare the priority score to priority scores for the other requests from the other Application Servers to create a transfer order mapping of the buffered requests. The SCEF can transfer data to the wireless communication device to complete the requested data transfer based on the mapping order. Other embodiments are described in the subject disclosure.

One or more aspects of the subject disclosure include a service capability exposure function server, including a processing system including a processor and a memory that stores executable instructions that, when executed by the processing system, facilitate performance of operations, including receiving, from an application server, a data transfer request associated with delivery of data from the application server to a wireless communication device that is connected to a mobile communication network. The operations can include storing the data transfer request associated with the wireless communication device with a plurality of data transfer requests associated with delivery of data to a plurality of wireless communication devices that are connected to the mobile communication network to thereby update a set of requests. The operations can also include determining a device identity of the wireless communication device according to the data transfer request associated with the wireless communication device, and, in turn, querying a home subscription server according to the device identity to obtain a subscription profile associated with the wireless communication device. The operations can further include determining a priority score for the data transfer request associated with the wireless communication device according to status information in the subscription profile associated with the wireless communication device. The operations can include comparing the priority score for the data transfer request associated with the wireless communication device to a plurality of priority scores associated with the plurality of wireless communication devices to generate a transfer order mapping of the set of requests. The operations can also include transferring the data from the application server to the wireless communication device to complete a data transfer associated with the wireless communication device according to the transfer order mapping of the set of requests.

One or more aspects of the subject disclosure include a machine-readable storage medium, comprising executable instructions that, when executed by a processing system including a processor, facilitate performance of operations at a service capability exposure function server, including receiving, from an application server, a data transfer request associated with delivery of data from the application server to a wireless communication device that is connected to a mobile communication network. The operations can include storing the data transfer request associated with the wireless communication device with a plurality of data transfer requests associated with delivery of data to a plurality of wireless communication devices that are connected to the mobile communication network to thereby update a set of requests. The operations can further include obtaining a subscription profile associated with the wireless communication device, and, in turn, determining a priority score for the data transfer request associated with the wireless communication device according to status information in the subscription profile associated with the wireless communication device. The operations can also include comparing the priority score for the data transfer request associated with the wireless communication device to a plurality of priority scores associated with the plurality of wireless communication devices to generate a transfer order mapping of the set of requests. The operations can further include transferring the data from the application server to the wireless communication device according to the transfer order mapping of the set of requests.

One or more aspects of the subject disclosure include a method, including receiving, by a processing system including a processor, from an application server, a data transfer request associated with delivery of data from the application server to a wireless communication device that is connected to a mobile communication network. The method can also include determining, by the processing system, a priority score for the data transfer request associated with the wireless communication device according to status information in a subscription profile associated with the wireless communication device. The method can further comparing, by the processing system, the priority score for the data transfer request associated with the wireless communication device to a plurality of priority scores associated with a plurality of data transfer requests associated with deliver of data to a plurality of wireless communication devices that are connected to the mobile communication network to generate a transfer order mapping of a set of requests comprising the data transfer request and the plurality of data transfer requests. The method can include transferring the data from the application server to the wireless communication device according to the transfer order mapping of the set of requests.

Figure 2:
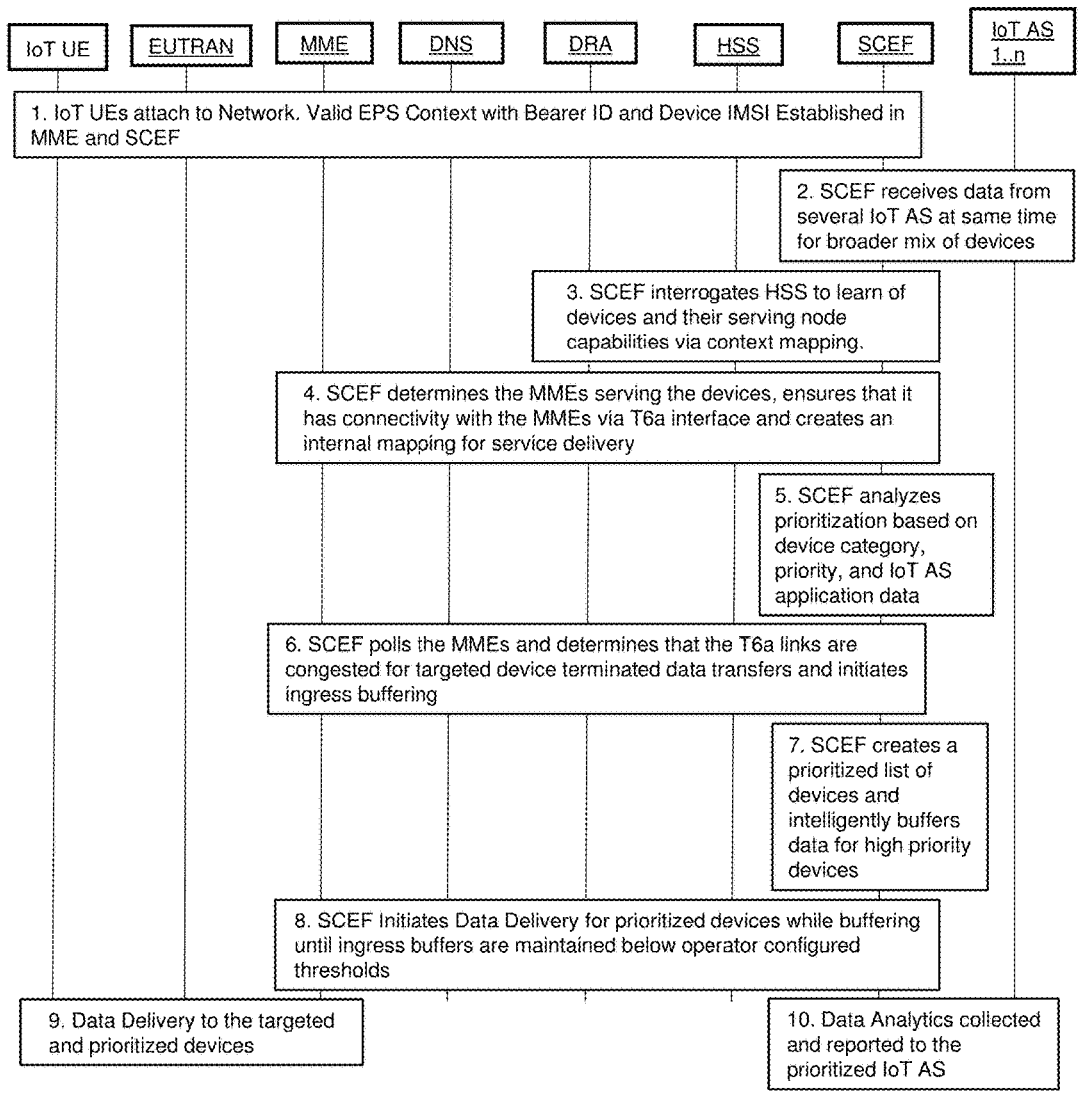
FIG. 2 depicts illustrative embodiments of a data flow diagram for data delivery to narrow band communication devices in a mobile communication network.

In FIG. 1, a mobile communication system 100 is illustrated that can provide wireless communication services, including voice, video and/or data services to wireless communication devices 116. In FIG. 2, illustrative embodiments are depicted for a data flow diagram for transferring data from an Application Server (AS) 170A-N to narrow band wireless devices 116 in a mobile communication network 100. The system 100 is a simplified version of a larger mobile communications network. System 100 can enable wireless communication services over a number of different networks, such as between wireless communication devices 116 and/or other communication devices and/or one or more application servers 170. The wireless communication devices 116 can be capable of voice, video and/or data communications, including cellular phones, smartphones, personal computers, media processing devices, and so forth. The wireless communication devices 116 can be fixed location machines with wireless communication capabilities, such as vending machines, utility meters, and monitoring devices that can advantageously communicate through the wireless capabilities of the system 100. The wireless communication devices 116 can be Narrow Band Internet of Things (NB-IoT) devices, which can exhibit characteristics of intermittent data transfer activity and the use of a narrow bandwidth of the available wireless data channel. The wireless communication devices 116 can been movable from location to location, while remaining wirelessly connected to the system 100 via various wireless communication assets of the system 100. The wireless communication devices 116 can, alternatively, remain in fixed locations with respect to the wireless communication assets of the system 100 so that, effectively, the wireless communication devices 116 can rely on specific wireless communication assets of the system 100.

In one or more embodiments, in addition to the wireless communication devices 116, the system 100 can include one or more Radio Access Networks (RAN) or Radio Access Technologies (RAT). In one embodiment, the system 100 can include a Universal Terrestrial Radio Access Network (UTRAN) 120 capable of supporting a wireless interface to a wireless communication device 116 in a Third Generation Wireless Mobile Communication Technology (3G) system. In this example, the wireless communication device 116 can support 3G IoT user equipment (3G IoT UE). In one embodiment, the system 100 can include a Long-Term Evolution (LTE) Radio Access Technology (RAT) network, or an LTE-Uu network 122, such as an Evolved UMTS Terrestrial Radio Access Network (E-UTRAN), a Universal Mobile Telecommunications System (UMTS), a Global System for Communications (GSM) network, an Evolution Data Only (EVDO) network, or a Code Division Multiple Access (CDMA) network. An LTE-Uu network 122 can provide radio communication assets for wireless connectivity between a wireless communication device 116 and a Mobile Packet Core (MPC) of the system 100. The LTE-Uu network 122 can utilize a number of interfaces, including Iu, Uu, Iub and/or Iur.

In one or more embodiments, the system 100 can include a Serving GPRS Support Node (SGSN) that can handle Packet Data Network (PDN) traffic for the 3G device. The system can also include a Service Capability Exposure Function (SCEF) 130 for providing non-IP PDN data paths between wireless communication devices 116 and one or more Application Server (AS) 170A-N. In one or more embodiments, a Mobility Management Entity (MME) 135, Serving Gateway (S-GW) 150, and PDN Gateway (P-GW) 160 can form a Cellular IoT Serving Gateway Node (C-SGN) 165 that can provide an IP, user plane PDN path to the AS 170A-N. In one or more embodiments, the system 100 can include a Home eNodeB node (HeNB) 115, which can perform a similar function to an eNodeB node 110, but can be optimized for a Small Cell LTE 128, such as relatively low-powered RAN that can operate in a building.

In one or more embodiments, the network 100 can be a cellular IoT core network that can facilitate connection of wireless communication devices 116 to the cellular IoT serving gateway node (C-SGN) 165. In this simplified system 100, the wireless communication devices 116 can be a Narrow Band Internet of Things (NB-IoT) device 116. In various embodiments, the wireless communication device 116 can alternatively or additionally be a member of one or more standard categories, such CATM, CATM1, CATM2, CAT1, CAT3, and CAT4. The C-SGN 165 can be a collapsed version of an evolved packet core network and can include an MME 135, an S-GW 150, and a P-GW 160.

In one or more embodiments, a wireless communication device 116 can be coupled to an eNodeB 110, via an LTE-Uu network 122. The wireless communication device 116 can carry many traffic types, including IP-based packet data network (PDN) traffic and non-IP PDN traffic. In one or more embodiments. An E-UTRAN-based LTE-Uu network 122 can include one or more eNodeB nodes 110 on the network that can be connected to each other via X2 interfaces and which can be further connectable to the network 100 via an S1-C interface. For example, an E-UTRAN-based LTE-Uu 122 can use various communication techniques including orthogonal frequency-division multiplexing (OFDM), multiple-input multiple-output (MIMO) antenna technology depending on the capabilities of the terminal, and beam forming for downlink to support more users, higher data rates and lower processing power required on each handset.

In one or more embodiments, an eNodeB 110 can include an air interface to an LTE-Uu network 122 and can include network interfaces S1-C to a Mobility Management Entity (MME) 130. The air interface can support an E-UTRAN-based LTE-Uu network 122, which can further support downlink and uplink protocols, including Orthogonal Frequency-Division Multiple Access (OFDMA) protocol and/or Single-Carrier Frequency-Division Multiple Access (SC-FDMA) protocol. The LTE-Uu interface 122 can enable the eNodeB 110 to receive requests for connection to the system 100 from various types of wireless communication devices 116, including smart phone devices and NB IoT devices.

In one or more embodiments, the eNodeB 110 can perform operations consistent with the 3GPP standard. In one or more embodiments, the eNodeB 110 can request attachment of the wireless communication device 116 to the network 100. In one embodiment, the eNodeB 110 can forward a connection request from the wireless communication device 116 to the MME 135. An authentication request for the wireless communication device 116 can be flow to the MME 135, for example, via a Non-Access Stratum (NAS) protocol message. The NAS protocol authentication request can flow directly from the wireless communication device 116 to the MME 135, via a tunneling protocol (GTP) link between eNodeB 110 and the MME 135. At the MME 135, the authentication request can be converted to an Internet Engineering Task Force (IETF) standard authentication message protocol, such as the Diameter protocol. The converted, authentication message in the Diameter protocol can be forwarded to a Home Subscription Service (HSS) server 115 for verification of the authentication request for the wireless communication device 116. In one embodiment, when the wireless communication device 116 is booted up, it can send an attach request or an authentication request to the MME 135 via eNodeB 110.

In one or more embodiments, the Home Subscriber Server (HSS) 140 can provide a central database that contains user-related and subscription-related information. The functions of the HSS 140 can include mobility management, call and session establishment support, user authentication and access authorization. In one embodiment, the HSS 140 can manage subscription-related information in real time, for multi-access and multi-domain offerings in an all-IP environment. The HSS 140 can be based on Home Location Register (HLR) and Authentication Center (AuC).

Upon powering up, the wireless communication device 116 can attach to a RAN, which can include the LTE-Uu 122 and the eNodeB node 110. Further, the wireless communication device 116 can seek to attach to the system 100 via a serving MME 135 that is within a given geographic coverage area, typically of a local RAN 122 and 110. In one or more embodiments, if a wireless communication device 116 does not have any type of activity over a certain time period, then the device 116 can enter into an IDLE mode in order to preserve its battery life. In one embodiment, the wireless communication device 116, the network RAN 122 and 110, and the MME 135 can support an extended IDLE mode Discontinuous Reception (DRX) capability that can save radio transmission power, as well as further extend the battery life of the device 116. An internal or external trigger can cause the wireless communication device 116 to transmit data. In this case, the wireless communication device 116 may need to establish a data connection to be able to engage in data transfer with the network 100 and/or a target application service (AS) 170 and/or a target application provider.

In one or more embodiments, during an attach attempt and/or during a PDN connectivity procedure for a wireless communication device 116, the serving MME 135 can request an authentication of the wireless communication device 116. The MME 135 can initiate the authentication with the assistance of the HSS 140 of the system 100. Upon successfully authenticating of the wireless communication device 116, the MME 135 can select a service capability exposure function (SCEF) 130 that can act as a gateway towards the external application server (AS) provider 170 for non-IP PDN communications with the AS 170.

In one or more embodiments, where the HSS 140 returns a successful authentication of the wireless communication device 116, the MME 135 can also perform control plane functions for enabling IP PDN communications with the AS 170. In one embodiment, the MME 135 can assign one or more bearer gateways 150 and 160 for use in transporting user data to and from the wireless communication device 116. For example, the MME 135 can assign one or more default bearer gateways 150 and 160 and/or one or more dedicated bearer gateways 150 and 160.

In one or more embodiments consistent with the 3GPP standard, after the MME 135 has performed assignment of bearer gateways 150 and 160 for the wireless communication device 116, the MME 135 can further perform updates and handovers on behalf of the wireless communication device 116 as the wireless communication device 116 moves between various LTE-Uu wireless network 122 locations. The MME 135 can assign initial bearer gateways 150 and 160 for the wireless communication device 116 based on location information associated with the wireless communication device 116. However, if the wireless communication device 116 moves to a different location, then the MME 135 can be required to update the assignment of the bearer gateways 150 and 160 to fulfill performance requirements. Hence, the MME 135 can assign and maintain bearer pathways for user data for the wireless communication device 116. In one or more embodiments, the eNodeB 110 supports a tunneling protocol pathway for authentication, control plane, and user plane for the wireless communication device 116.

In one or more embodiments, the MME 135 can also perform functions such as idle mode tracking and paging procedure including retransmissions. The MME 135 can choose an S-GW 150 for the wireless communication device 116. The S-GW 150 can route and forward user data packets, while also acting as the mobility anchor for the user plane during inter-eNodeB handovers and as the anchor for mobility between LTE and other 3GPP technologies. For a wireless communication device 116 in idle state, the S-GW 150 can terminate a downlink data path and can trigger paging when downlink data arrives for the wireless communication device 116. The S-GW 150 can manage and can store contexts, such as parameters of an IP bearer service and/or network internal routing information.

In one or more embodiments, the PDN Gateway (P-GW) 160 can provide connectivity from the wireless communication device 116 to external packet data networks, including the AS 170A, by being the point of exit and entry of traffic for the wireless communication device 116. The wireless communication device 116 can have simultaneous connectivity with more than one P-GW 160 for accessing multiple PDNs. The P-GW 160 can perform policy enforcement, packet filtering for each user, charging support, lawful interception and/or packet screening. The P-GW 160 can also act as the anchor for mobility between 3GPP and non-3GPP technologies such as WiMAX and 3GPP2 (CDMA 1× and EvDO).

In a conventional and simplistic wireless communication LTE core network 100, the MME 135 can be connected to the SCEF 130 in a 1:1 peered mode, as shown. The SCEF 135 could also be connected to one or more external IoT Application Servers 170A-N in a 1:1 peered mode. These connections can enable data transfers associated with each given AS 170A-N. In this simplified arrangement, the wireless communication device 116 can be attached to the LTE high-speed mobility network to gain services from their target AS 170A in the Home PLMN (HPLMN) network 100. The wireless communication device 116 and eNodeB 110 can initiate an attach request procedure and/or PDN connectivity request procedures with the MME 135 for that geographical RAN region. The attach procedure can then authenticate the wireless communication device 116 prior to establishment of its non-IP PDN data connection towards the SCEF server 130.

In one or more embodiments, prior to the PDN connection establishment for the wireless communication device 116, the MME 135 should have connectivity with the SCEF 130 using the T6a signaling interface as defined in the 3GPP standards. The T6a interface can be Diameter based and can use SCTP as the transport layer protocol with a defined application identifier. The direct connectivity between MME and SCEF simplifies the overall LTE core network architecture design for wireless communication device 116 services delivery. In such a paired mode design, the MME and SCEF networking entities can have proper nodal identification, addressing and configuration to be able to exchange bidirectional control plane message exchanges that can enable user payload data transfers. However, a multi-homed network, such as illustrated in FIGS. 3-4, can result in a much simpler T6a interface SCTP profile, Diameter protocol and application layer definitions, and IP addressing. The simple IoT core network 100 of FIG. 1, can require direct MME-SCEF interconnections and the availability of active T6a links for establishing the PDN connection setup with the SCEF 135. The resulting PDN connection can also trigger the creation of an EPS bearer context in the MME 135 and the SCEF server 130. The bearer context information that is created in the MME 135 and the SCEF server 130 can be critical for facilitating ingress/egress data transfer between the SCEF server 130 and related upstream/downstream peer networking entities to create a successful end-to-end data service flow for the wireless communication devices 116.

In one or more embodiments, the SCEF server 130 can receive a request from an Application Server 170A for transmission of data to a wireless communication device 116. The request can include the data that is intended for the wireless communication device 116. The SCEF server 130 can buffer the request along with other requests from one or more Application Servers 170A-N for transmitting data to one or more wireless devices 116 connected to the LTE system 100. The SCEF server 130 can obtain subscription profile information for the wireless communication device 116. In one embodiment, the SCEF server 130 can determine an identification for the wireless communication device 116, such as an International Mobile Subscriber Identity (IMSI). The SCEF server 130 can determine the identity from the transfer request. In one embodiment, the SCEF server 130 can use the identity of the wireless communication device 116 to interrogate the HSS 140 for subscription information associated with the wireless communication device 116.

In one or more embodiments, the SCEF server 130 can determine the one or more MMEs 140 serving the wireless communication devices 116. The SCEF server 130 can ensure that it has connectivity with the MMEs 140 via a T6a interface and can create an internal mapping for service delivery. In one or more embodiments, the SCEF server 130 can analyze prioritization of the wireless communication device 116 based on device category. The SCEF server 130 can determine a priority score for the wireless communication device 116 based on status information from its subscription profile. In one or more embodiments, the SCEF server 130 can poll the MMEs 140 and determine that the T6a links are congested for targeted device terminated data transfers and initiates ingress buffering. The SCEF server 130 can determine latency metrics associated with the data path for the data transfer. For example, the SCEF server 130 can query a domain name server (DNS) to obtain latency metrics for various elements or devices in the data path, such as the MME 140, the eNodeB 110, and the LTE-Uu 122.

In one or more embodiments, the SCEF server 130 can compare the priority score to priority scores for the other requests from the other Application Servers to create a prioritized list of devices or a transfer order mapping of the buffered requests based on additional attributes such as service type, device category, device priority etc., The SCEF server 130 can initiate data deliver to the prioritized devices while buffering until ingress buffers are maintained below operator configured thresholds. The SCEF sever 130 can transfer data to the wireless communication device 130 to complete the requested data transfer based on the mapping order.

At FIG. 3, in one or more embodiments, a system for providing communication services for narrow band wireless devices in a mobile communication network using geo-redundant data centers with one-to-one paired modes is illustrated. The system 300 for serving wireless communication devices can include multi-vendor RANs. In one or more embodiments, the RANs can be served by a MME regional pool network 335. Each MME in the pool 335 can be one-to-one paired with a single vendor, geo-redundant SCEF pair from the SCEF pooled network 330. In addition, each SCEF can receive data requests from an Application Server from an Application Server pool 370. In this configuration, each SCEF pair can be statically provisioned with nodal information for each MME pair, such as the MME node name, or CLLI, and node identifiers. Similarly, each MME pair can be provisioned with a SCEF nodal pair. A paired mode, MME-SCEF design, such as system 300 can be relatively less complex in terms of it IoT core network configuration than a distributed MME-SCEF design. However the details of each MME network element must be configured in the SCEF pair for each of the multiple RAN vendors. Pre-defined static mapping of MME-SCEF pairs requires a comprehensive listing of MME and SCEF control nodes that may be required for PDN connection establishment and a data transfer mechanisms in a distributed IoT core network 300. This complex static mapping can be avoided by segregating the MME and SCEF provisioning steps using a dynamic node selection methodology. Node selection in the MME can be simplified by dynamic node selection, and optimal and intelligent routing of IoT user data towards SCEF control nodes can be achieved.

FIG. 4 depicts illustrative embodiments of a system for providing communication services for narrow band wireless devices in a mobile communication network using geo-redundant data centers with dynamically paired modes. In a large scale, distributed core network architecture network 400 deployment for serving millions of LTE users as well as millions of wireless communication devices, the above-described direct (one-to-one) MME-SCEF connectivity approach cannot be applied. One-to-one pairing in a large-scale distributed core network architecture can be prohibitively complex and inefficient and can result in significant overhead costs for maintenance as well as growth.

In one or more embodiments, large scale, distributed core network architecture network 400 can deploy MME and SCEF nodes according to one or more architectures that move beyond one-to-one pairing and into dynamic pairing. At FIG. 4, SCEFs could be in geo-redundant data centers 430. MMEs could be in geo-redundant data centers across multiple regional pools 435. In one or more embodiments, the dynamic connectivity model that is used in FIG. 4 can rely on principles of Network Functions Virtualization (NFV) and Software Defined Networking (SDN) technologies and can use open standards protocols. The SCEF can be provisioned with information for all of the downstream MME network elements to ensure that the PDN connection procedures happen appropriately with the right nodes. The SCEF can also be provisioned with PGW nodes to enable dynamically switching of the data delivery path to the user plane on demand. The static provisioning method in the architecture of FIGS. 1 and 3 may not as amenable or flexible in accommodating large sets of wireless devices 116 or Application Server pools 470. In addition, the one-to-one architecture is not as suitable for premium wireless communication services offered in targeted geographic coverage areas, data acquisition and reporting of dynamic device behaviors in such areas, and/or new service demands and application that are anticipated and/or required to provide the necessary quality of experience associated with a massive IoT devices. Customer dissatisfaction and churn can results in a ripple effects with revenue loss against multitude of mobile IoT services across several industry verticals. In one or more embodiments, the dynamic pairing in the network 400 of FIG. 4 can provide dynamic, flexible and intelligent IoT core network solution without requiring the same level of upfront requirements planning, nodal software release development, and network level integration cycles that lead to delayed time to market.

FIG. 5 depicts an illustrative embodiment of a method 500 used in portions of the described in FIGS. 1 and 3-4 for dynamically selecting and routing IoT device data in a mobile communication network. In step 504, the SCEF server can receive a data transfer request from an Application Server. The transfer request can be directed to a single wireless device or directed to several devices. In one or more embodiments, the wireless communication device can be an Internet of Things (IoT) device. In one embodiment, the IoT device can be a narrow band device. In step 508, the SCEF server can store the transfer request with one or more other data transfer requests. The transfer request can include the data that the Application server intends to transfer to the wireless communication device. In step 512, the SCEF server can determine the device identity of the wireless communication device from the transfer request.

In step 516, the SCEF server can query an HSS to obtain the subscription profile for the wireless communication device. The HSS can provide status information for the wireless communication device, such as a device category, an access priority for the device, and/or a supported application (or application service) associated with the device. In one embodiment, the HSS can identify a mobile management entity (MME) that is associated with the wireless device and/or the SCEF server. In step 520, the SCEF server can determine a priority score for the data transfer request based on the status information in the subscriber profile. In step 524, the SCEF server can compare the priority score for the data transfer request targeted to the wireless device with one or more other data transfer requests. The additional data transfer requests can originate from one or more Application Servers that are coupled to the LTE mobile communication system and can target one or more wireless communication devices. The SCEF sever can generate a transfer order mapping for the requests that are stored at the buffer.

In step 528, the SCEF server can determine if the transfer request for the wireless device is the highest current priority and, if so, then the SCEF server can transfer the data associated with the request to the wireless communication device via the MME, in step 532

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with systems 100 and 300-400 of FIGS. 1, 3, and 4, as another representative embodiment of communication system 600 for transferring data from Application servers to wireless communication devices.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

A SCEF server 130 of FIG. 1 can be operably coupled to communication system 600 for purposes similar to those described above. SCEF server 130 can perform function 662 and thereby provide dynamic data path services to the CDs 601, 602, 603 and 605 of FIG. 6 similar to the functions described for SCEF server 130 of FIG. 1 in accordance with method 500 of FIG. 6. CDs 601, 602, 603 and 605, which can be adapted with software to perform function 672 to utilize the services of the SCEF server 130. SCEF server 130 can be an integral part of the application server(s) 617 performing function 674, as adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

FIG. 7 depicts an illustrative embodiment of a communication device 700. Communication device 700 can serve in whole or in part as an illustrative embodiment of the devices depicted in FIGS. 1, 3, 4, and 6 and can be configured to perform portions of method 500 of FIG. 5.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1, 3, and 4, as well as the IMS CDs 601-602 and PSTN CDs 603-605 of FIG. 6. It will be appreciated that the communication device 700 can also represent other devices that can operate in systems 100, 300, and 400, of FIGS. 1, 3, and 4, communication system 700 of FIG. 7, such as a narrow band IoT device 116, and SCEF server 130. In addition, the controller 706 can be adapted in various embodiments to perform the functions 662-674, respectively.

Upon reviewing the aforementioned embodiments, it would be evident to an artisan with ordinary skill in the art that said embodiments can be modified, reduced, or enhanced without departing from the scope of the claims described below.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the SCEF server 130, the wireless communication devices 116, the SCEF nodes 135, SGSN 125, and the C-SGN 165, and other devices of FIGS. 1, 3-4, 6, and 7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and/or HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
  a processing system including a processor;
  a memory that stores executable instructions operating as a service capability exposure function that, when executed by the processing system, facilitate performance of operations, comprising:
    receiving, from an application server, a data transfer request associated with delivery of data from the application server to a wireless communication device that is connected to a mobile communication network;
    storing the data transfer request associated with the wireless communication device with a plurality of data transfer requests associated with delivery of data to a plurality of wireless communication devices that are connected to the mobile communication network to thereby update a set of requests;
    determining a device identity of the wireless communication device according to the data transfer request associated with the wireless communication device;
    querying a home subscription server according to the device identity to obtain a subscription profile associated with the wireless communication device;
    determining a priority score for the data transfer request associated with the wireless communication device according to status information in the subscription profile associated with the wireless communication device;
    comparing the priority score for the data transfer request associated with the wireless communication device to a plurality of priority scores associated with the plurality of wireless communication devices to generate a transfer order mapping of the set of requests;
    obtaining latency metrics associated with a data path for the data transfer associated with the wireless communication device according to a mobile management entity associated with the wireless communication device;
    adjusting the transfer order mapping of the set of requests according to the latency metrics associated with the data path for the data transfer request associated with the wireless communication device to generate an adjusted transfer order mapping; and
    transferring the data from the application server to the wireless communication device according to the adjusted transfer order mapping of the set of requests to complete a data transfer associated with the wireless communication device, wherein the transferring of the data is facilitated by the mobile management entity associated with the wireless communication device, wherein the mobile management entity is dynamically paired to the server from a pool of a plurality of mobile management entities.

2. The server of claim 1, wherein the data path for the data transfer request associated with the wireless communication device includes the mobile management entity associated with the wireless communication device.

3. The server of claim 1, wherein the operations further comprise querying a domain name server according to the mobile management entity associated with the wireless device to obtain the latency metrics associated with the data path for the data transfer associated with the wireless communication device.

4. The server of claim 1, wherein the operations further comprise querying the home subscription server according to the device identity to identify the mobile management entity associated with the wireless communication device.

5. The server of claim 1, wherein the application server is dynamically paired to the server from a pool of a plurality of application servers.

6. The server of claim 1, wherein the application server identifies the server from a pool of a plurality of servers operating as service capability exposure functions.

7. The server of claim 1, wherein the wireless communication device is an Internet of Things device.

8. The server of claim 1, wherein the wireless communication device is a narrow band device.

9. The server of claim 1, wherein the plurality of data transfer requests are associated with a plurality of application servers.

10. The server of claim 1, wherein the status information in the subscription profile includes a device category, an access priority, a supported application, or any combination thereof, that are associated with the wireless communication device.

11. The server of claim 1, wherein the operations further comprise correlating the subscription profile associated with the wireless communication device and a context for the wireless communication device in an evolved packet core of the mobile communication network to generate a correlated view of the subscription profile, and wherein the priority score is further determined according to the correlated view of the subscription profile.

12. The server of claim 1, wherein the home subscription server is queried by via a Diameter interface.

13. A non-transitory machine-readable storage medium, comprising executable instructions that, when executed by a processing system including a processor, facilitate performance of operations at a server operating as a service capability exposure function, comprising:
receiving, from an application server, a data transfer request associated with delivery of data from the application server to a wireless communication device that is connected to a mobile communication network;
storing the data transfer request associated with the wireless communication device with a plurality of data transfer requests associated with delivery of data to a plurality of wireless communication devices that are connected to the mobile communication network to thereby update a set of requests;
obtaining a subscription profile associated with the wireless communication device;
determining a priority score for the data transfer request associated with the wireless communication device according to status information in the subscription profile associated with the wireless communication device;
comparing the priority score for the data transfer request associated with the wireless communication device to a plurality of priority scores associated with the plurality of wireless communication devices to generate a transfer order mapping of the set of requests;
obtaining latency metrics associated with a data path for the data transfer associated with the wireless communication device according to a mobile management entity associated with the wireless communication device;
adjusting the transfer order mapping of the set of requests according to the latency metrics associated with the data path for the data transfer request associated with the wireless communication device to generate an adjusted transfer order mapping; and
transferring the data from the application server to the wireless communication device according to the adjusted transfer order mapping of the set of requests, wherein the transferring of the data is facilitated by the mobile management entity associated with the wireless communication device, wherein the mobile management entity is dynamically paired to the server from a pool of a plurality of mobile management entities.

14. The non-transitory machine-readable storage medium of claim 13, wherein the operations further comprise querying a home subscription server according to a device identity of the wireless communication device to identify a mobile management entity associated with the wireless communication device.

15. The non-transitory machine-readable storage medium of claim 14, wherein the data path for the data transfer associated with the wireless communication device includes the mobile management entity associated with the wireless communication device.

16. The non-transitory machine-readable storage medium of claim 15, wherein the data path for the data transfer request associated with the wireless communication device includes a radio access network associated with the wireless communication device.

17. The non-transitory machine-readable storage medium of claim 13, wherein the application server identifies the server from a pool of a plurality of servers operating as service capability exposure functions.

18. A method, comprising:
receiving, by a processing system including a processor, from an application server, a data transfer request associated with delivery of data from the application server to a wireless communication device that is connected to a mobile communication network;
determining, by the processing system, a priority score for the data transfer request associated with the wireless communication device according to status information in a subscription profile associated with the wireless communication device;
comparing, by the processing system, the priority score for the data transfer request associated with the wireless communication device to a plurality of priority scores associated with a plurality of data transfer requests associated with deliver of data to a plurality of wireless communication devices that are connected to the mobile communication network to generate a transfer order mapping of a set of requests comprising the data transfer request and the plurality of data transfer requests;

obtaining latency metrics associated with a data path for the data transfer associated with the wireless communication device according to a mobile management entity associated with the wireless communication device;

adjusting the transfer order mapping of the set of requests according to the latency metrics associated with the data path for the data transfer request associated with the wireless communication device to generate an adjusted transfer order mapping; and transferring, by the processing system, the data from the application server to the wireless communication device according to the adjusted transfer order mapping of the set of requests, wherein the transferring of the data is facilitated by the mobile management entity associated with the wireless communication device, wherein the mobile management entity is dynamically paired to the server from a pool of a plurality of mobile management entities.

19. The method of claim 18, further comprising storing, by the processing system, the data transfer request associated with the wireless communication device with the plurality of data transfer requests associated with the plurality of wireless communication devices that are connected to the mobile communication network.

20. The method of claim 19,
wherein the data path for the data transfer request associated with the wireless communication device includes the mobile management entity associated with the wireless communication device.

\* \* \* \* \*